Feb. 24, 1959 H. H. KOPPEL ET AL 2,875,427
TELEMETERING SYSTEM
Filed Jan. 18, 1956 3 Sheets-Sheet 1
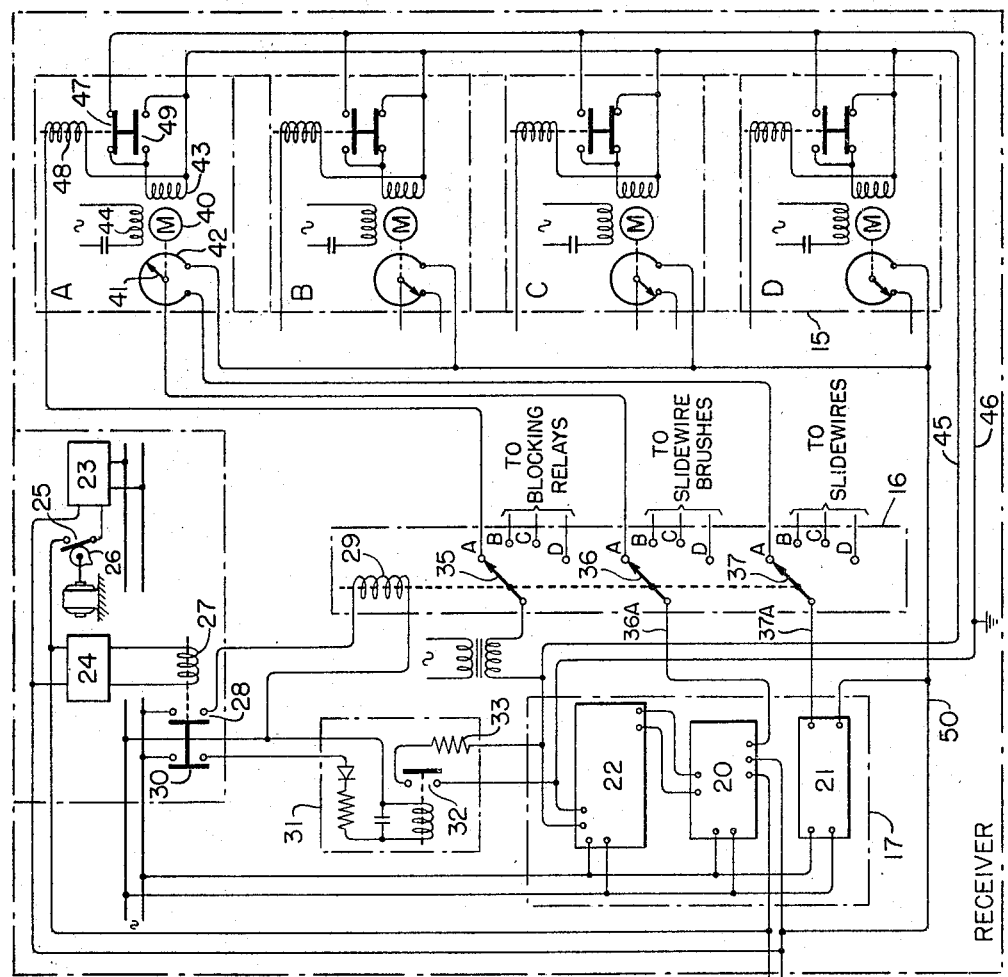
FIG. 1
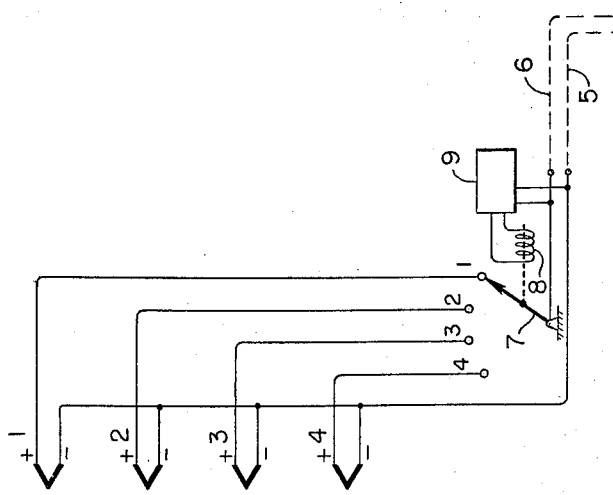
INVENTORS
HAROLD H. KOPPEL
AND
BY STANLEY G. KASMINSKY
*Arthur L. Wade*
ATTORNEY INVENTORS
HAROLD H. KOPPEL
AND
STANLEY G. KASMINSKY
BY
Arthur L. Wade
ATTORNEY

United States Patent Office 2,875,427
Patented Feb. 24, 1959

2,875,427

TELEMETERING SYSTEM

Harold H. Koppel, South Euclid, and Stanley G. Kasminsky, Euclid, Ohio, assignors to Bailey Meter Company, a corporation of Delaware Application January 18, 1956, Serial No. 559,890

11 Claims. (Cl. 340—150)

This invention relates to the long distance transmission of intelligence, particularly to the transmission of the instantaneous value of variable conditions, positions or the like. The variables transmitted may be pressure, temperature, rate of flow, electrical values, the position of objects, etc. Through this mode of transmission, intelligence may be collected at a central control center concerning conditions existing at one or more remotely located stations where conditions may be changing. At the control center, an operator may utilize the intelligence for control of the variables.

A specific embodiment of the invention is disclosed. This embodiment assumes the availability of instrumentalities for detecting the magnitude of variable conditions and converting them into D.-C. voltages which represent the magnitudes of the conditions. The D.-C. voltages are sequentially applied to a common pair of telephone lines. Over the common pair of transmission lines, A.-C. voltage of a predetermined frequency is transmitted for actuation of the mechanism which synchronizes the sequence-selecting structure applying the D.-C. voltages to the lines.

The concepts of the present invention were formed under selected limitations. A limitation to one pair of transmission lines for the intelligence between widely removed points was an initial, fundamental, limitation. Another requirement was that the intelligence transmitted to the receiving, or control, station was to be recorded continuously by separately recording pens. Another requirement, in the interest of economy, was the use of a unitary circuit, receiving the transmitted D.-C. voltages in common and generating an output sequentially applied to the positioning of predetermined motors. The motors would, in turn, position electric elements to balance the transmitted D.-C. voltages and simultaneously actuate means manifesting the magnitude of the transmitted D.-C. voltages.

In telemetering systems for D.-C. voltage signals, requiring a number of such represented variables to be scanned and recorded, it becomes evident that the use of a separate converter-amplifier-motor control circuit for each measured variable becomes uneconomical. That is, the ratio of the time each circuit is in use to the total time of a complete cycle of the scanner is quite small. As a result, it becomes advisable to use a single, unitary, circuit for a number of measured variables scanned. The only item common to all the measuring units becomes the unitary circuit package. This packaged, unitary, converter-amplifier-motor control circuit is shifted along in controlling the individual balancing motors actuating indicating and/or recording pens located in a common, or separate, recorder.

With the accepted limitation of a single, unitary circuit which performs any necessary transduction and amplification of electrical signals and applies them to a control circuit, the structure embodying the invention is constructed around stepping switches at the transmitter and receiver locations. These switches, having a multiplicity of positions, are caused to connect companion receivers and transmitters in going through their cycles. The separate switches are coordinated in their cycles. Additionally, structure is provided to suspend motor operation positively during the period its control winding is not connected to the common drive circuit of the receiving motors. Additionally, structure for timing application of the common drive circuit to the separate motors, in synchronization with the action of the stepping switch, is provided to isolate transient outputs of the drive circuit from the control windings of the separate motors.

It can now be appreciated that a principal object of the invention is to provide a method and means for remotely, and periodically, ascertaining the value of a plurality of variable conditions.

Another object of the invention is to provide for bringing a plurality of variables to a central location for utilization by an operator.

Another object of the invention is to provide a basic sequence for scanning a plurality of variables at a number of points and utilizing a common, unitary, converter-amplifier-motor drive circuit, for a plurality of motors individually responsive to the variables.

Still a further object of the invention is to provide for the positive immobilization, plugging, holding or freezing of all of a plurality of motors while they are not being positioned by a common motor drive circuit responsive to a selected variable.

A still further object of the invention is to provide for dissipating the output of a common motor drive circuit for a plurality of motors in a shorting circuit for a predetermined length of time spanning the appearance of transient output signals in the motor drive circuit.

Referring to the drawings:

Fig. 1 is a somewhat diagrammatic illustration of a complete telemetering scheme embodying the invention.

Figure 2:
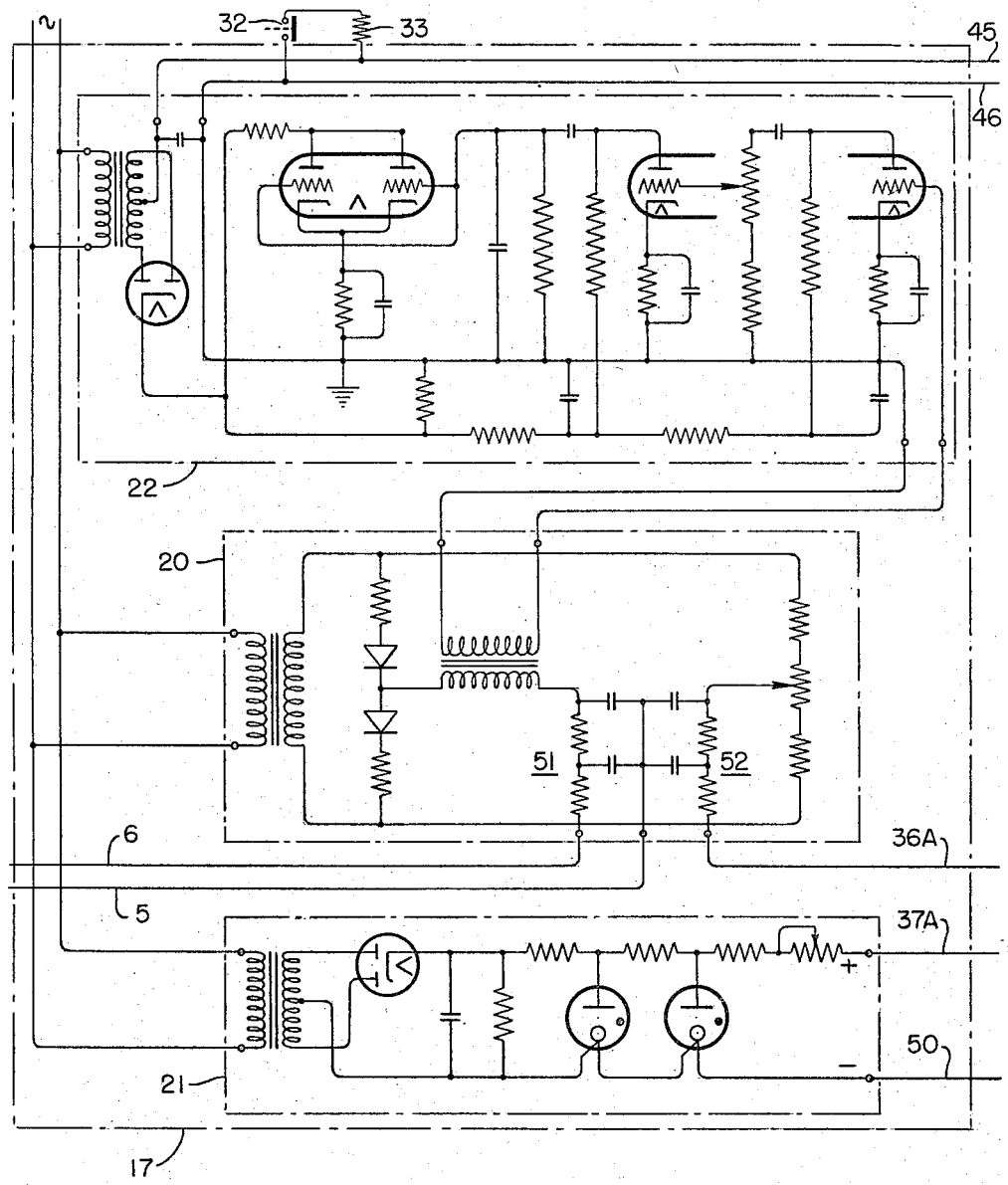
Fig. 2 is a complete wiring diagram of the unitary converter-amplifier-motor drive circuits shifted along the plurality of balanceable networks scanned in the telemetering scheme of Fig. 1.

Referring to the disclosure of Fig. 1, it must first be appreciated that a transmitter and a receiver have been separately illustrated, connected by a pair of transmission lines. An indication of substantial length in these lines has been attempted. In actual practice, they may be a pair of telephone lines connecting transmitter and receiver over a distance of miles.

At the transmitter, there has been indicated four thermocouples as representative of a plurality of sources of varying electrical characteristics. It is generally appreciated that thermocouples, exposed to conditions of varying temperature, will produce D.-C. voltages in accordance with the magnitude of the temperature to which they are exposed. However, it is re-emphasized that the thermocouples actually disclosed are merely representative of any source of D.-C. potential and, in a larger sense, are representative of any primary element transducers which will produce electrical characteristics varying in accordance with conditions to which they are exposed. Further, illustration of four transducers, at the transmitter, is by no means a limitation on the invention. The number was arbitrarily selected in accordance with physical space limitations having no effect on the scope of the invention.

Designating the thermocouples 1—2—3—4, at the transmitter, it is to be appreciated that they are sequentially connected to transmission lines 5 and 6. The positive and negative sides of the thermocouples have been indicated. The negative side of the thermocouples have a common connection to transmission line 5. A selector switch is actuated to sequentially connect a positive side of the thermocouples to transmission line 6.

In actual form, the selector, or stepping, switches, may be relatively intricate mechanisms. In principle, one may be regarded as a simple switch arm sequentially shifted along a number of contacts. At the transmitter of Fig. 1 the switch arm 7 dominates the structure. This arm 7 is shown as pivoted to sequentially engage contacts joining the positive side of thermocouples 1—2—3—4, and consequently, transmission line 6 of the telephone pair.

Switch arm 7, of the stepping switch of the transmitter, is shifted in position by solenoid coil 8. Coil 8 is energized, to step the switch, by the output of transducer 9. Transducer 9 is connected to transmission lines 5 and 6 and responds to an A.-C. voltage of selected frequency to produce the D.-C. current output. These A.-C. voltages of selected frequency are sometimes referred to as "tone" signals.

Synchronizing systems for stepping switches are common in the telemetering art. The structure for actuating the selector switches at the transmitter and receiver, within the systems, may assume various forms. One form these systems and their components may take has been disclosed in George R. Markow SN 472,315, filed December 1, 1954, now patent 2,835,884. In the disclosure of Fig. 1, it appeared necessary only to indicate that a source of A.-C. voltage of predetermined frequency is generated and applied, through transmission pair 5 and 6, to the transducer at the transimitter and directly to the transducer at the receiver. The A.-C. voltage will be transduced to D.-C. voltage which will simultaneously energize the solenoid coils of the stepping switches. Other structure, not disclosed here, but one form of which is disclosed in the Markow patent, may be utilized to provide synchronization of the transmitting and receiver stepping switches.

Referring specifically to the receiver of Fig. 1, the structure has been broken down into groups to clarify their function and interrelation. Group 15 includes elements ultimately positioned by the output of thermocouples 1—2—3—4. Specifically these elements are electric motors whose positioning of manifesting means exhibits and/or controls the magnitude of the conditions to which thermocouples 1—2—3—4 are exposed. Ultimately, the output of each of the thermocouples is applied to the control circuit of a complementary motor of group 15.

Stepping switch 16, of the receiver, is synchronized with the transmitting stepping switch 7 to sequentially connect thermocouples 1—2—3—4 to their respective motors of group 15. Actually a conventional balanceable electric network is formed, through the switches, between each thermocouple and positioned motor. The balanceable network, to form a complete system, must include a circuit which detects unbalance voltages, converts them to a desirable form, amplifies them and generates a power signal for the drive circuit of the motor which positions adjustable electric units to rebalance the network. The structure of 17 is a unit common to all the balanceable networks including the primary element transducers of the transmitter and the ultimately positioned elements of the receiver. Certain of the broad concepts of the invention are carried out when this unitary, common circuit 17 is sequentially connected into the balanceable electric networks. Obviating the usage of separate circuits, similar to 17, for each of the balanceable electric networks formed in the scanning operation is a significant saving in telemetering systems. Certain problems arise by shifting unitary circuit 17 among the balanceable electric networks, but these problems have been solved by structure to be disclosed, specifically, hereinafter.

Unitary circuit 17 has been depicted in greater detail in Fig. 2. Depending on the type of primary element transducer, and ultimately responsive exhibiting element utilized, the unitary circuit may take various forms. In the present disclosure, the use of thermocouples 1—2—3—4 has made it desirable to provide a converter 20, a source of constant reference voltage 21 and a multi-stage electronic amplifier and motor drive circuit 22. One form for the circuits of 17 has been disclosed in Harold H. Koppel SN 539,060, filed October 7, 1955, now Patent 2,835,855. The circuits have been shown in detail in Fig. 2, along with filter circuits for the input and output of the group, in order to appreciate the function of other structure embodying invention and hereinafter described. Having generally indicated the structure and function of dominating unitary circuit 17, stepping switch 16 and motor group 15 in Fig. 1, the specific actuation of stepping switch 16 and its synchronization with stepping switch 7 may now be contemplated.

*Stepping switch actuation*

Turning specifically to the actuating mechanism of Fig. 1 for the stepping switches at the transmitter and receiver, generator 23 is indicated as a source of A.-C. voltage of selected frequency which is applied to transducer 24 and transducer 9. The output of generator 23 is applied, simply, by parallel circuits to the transmitter and receiver transducers 9 and 24. When the circuit is completed between the generator 23 and transducers 9, 24 the transmitter and receiver stepping switches are advanced simultaneously. The timing of the stepping actions is predetermined by the intervals at which the output of generator 23 is applied to the circuits of transducers 9 and 24. Switch 25 is provided in the output circuit of generator 23 and is periodically opened and closed by cam 26, rotated by a motor at a predetermined fixed speed.

The output of generator 23 is applied to transducers 9 and 24 in pulses, determined by the speed at which switch 25 is opened, and closed. Solenoid coil 8 and solenoid coil 27 are, therefore, simultaneously energized for predetermined intervals of time. Solenoid coil 8 supplies the power to advance the transmitter stepping switch. Solenoid coil 27 does not act upon the switch-arm mechanism of 16 directly, as is the case with coil 8 at the transmitter, but actuates switch 28 through which switch coil 29 is energized to directly step switch 16. Switch 30 is also actuated by coil 27 to energize the circuit of a time-delay relay 31 which shorts the output of the motor drive circuit of unitary circuit 17 for a predetermined length of time.

*Time-delay relay 31*

Time-delay relay 31 is quite simple, in principle. An input circuit for the relay is formed by conductors attached to a line supply of A.-C. voltage and a rectifier. The rectified A.-C. voltage is applied to the solenoid coil of the relay through a series resistance and a parallel capacitor. Specific designation of these component elements of the time-delay relay is considered unnecessary to an understanding of the function of the relay. The resistance and capacitor determine the time required in which the solenoid coil of the relay will reach maximum energization, and when the supply from the line is broken, the corresponding decay of voltage across the solenoid coil. The characteristic of voltage-time relationships across the solenoid coil are carefully selected to carry out an important object of the invention.

The sole purpose of time-delay relay 31 is to actuate switch 32. When switch 32 is closed the output of the motor drive circuit, as a portion of unitary circuit 17, is shorted through resistance 33. More specifically, it is the purpose of relay 31 to short the output of the motor drive circuit, through 33, for a predetermined length of time. The need for this function will be appreciated through subsequent analysis of the action of certain filter circuits included within converter 20 of the unitary package 17. It is sufficient to point out, at this time, that the basic action of energizing coil 27 will step the transmitter and receiver stepping switches together and, simultaneously, cause a dissipation of the output of the motor drive circuit of the converter-amplifier-motor drive package 17, through resistance 33, for a predetermined period of time.

Stepping switch 16

Stepping switch 16 is basically similar to the transmitting stepping switch, characterized by switch arm 7. Stepping switch 16 has three switch arms 35—36—37. It is to be re-emphasized, at this point, that the number of switch arms i. e., the complication of switch 16, has no direct bearing on the scope of the present invention.

The number of switch arms utilized in switch 16 is determined by the complexity of the circuits grouped into package 17. Each switch arm, and its associated contacts, may be referred to as a "deck" of the switch. The switch arms of all decks move together by common connection between switch arms 35—36—37. The decks then are dominated in character, by the switch arms and will be correspondingly referred to as decks 35—36—37.

Deck 35 energizes blocking switches in each of motor groups 15. Each of the motor groups contain potentiometers, as representative of electric balance elements in the balanceable networks. Deck 36 connects the movable brush of each of these adjustable potentiometers to converter 20 of unitary circuit 17. Deck 37 connects one end of the slidewires of the potentiometers to reference 21 of unitary circuit 17.

The three decks of switch 16 are shown in their first position, corresponding to the first position of the transmitter stepping switch 7. It can now be shown that, with the stepping switches in their illustrated positions, a balanceable electric network is formed which is unbalanced by variations in the conditions to which thermocouple 1 is exposed and rebalanced by the positioning of the movable brush along the slidewire of the potentiometer of the first motor of group 15. The unbalance of the network, formed by this position of the stepping switches, is sensed by unitary circuit 17 and the output of its motor drive circuit will rotate the first motor of group 15, and the brush connected to the motor, until balance is restored in the circuit. This unbalance and rebalance structure and action of the network is conventional, and disclosed in at least Harold H. Koppel S. N. 539,060, filed October 7, 1955, now Patent 2,835,855.

Motor group 15

Motor group 15 has been divided into four identical sections for ready appreciation of their function. The sections have been designated A—B—C—D. As the stepping switches of the transmitter and receiver are illustrated as connecting the motor of group A into the telemetering circuit, the detailed explanation of the components of this A group will represent the function of the remaining groups as the stepping switches cycle.

Motor 40 may now be specifically designated as the element ultimately positioned by the balanceable electric network responsive to the variable condition to which thermocouple 1 is exposed. Motor 40 mechanically positions movable brush 41 along slidewire 42. Brush 41 and slidewire 42 comprise a potentiometer as representative of the balanceable electric element of the balanceable network to which unitary circuit 17 is coupled by stepping switch 16.

Motor 40 also mechanically positions exhibiting and/or controlling apparatus not disclosed here. It is sufficient to understand that motor 40 is controlled, in its rotation, by signals applied to control winding 43 by the motor drive circuit of package 17.

It is now further pointed out that motor 40 is a conventional capacitor-run motor with control winding 43 and reference winding 44. All of the control windings of the motors of group 15 make common connections with conductor 45 and conductor 46 to the motor drive circuit of package 17. Common connection conductor 45 has a permanent union with one side of all of the control windings of the motors while the other side of the control windings are completed in union with common conductor 46 through individual blocking switches.

Blocking switch 47—48—49

Closer examination of the switch 47—48—49 of motor group A demonstrates it is actuated by solenoid coil 48. Both switch 47 and 49 are actuated by coil 48. When switch 47 is closed and control winding 43 is connected solenoid coil 48 and a source of line supply is completed through deck 35 of stepping switch 16, as heretofore indicated in discussing switch 16. When coil 48 is energized swicth 47 is closed and control winding 43 is connected to conductors 45 and 46. All other blocking switches of motor group 15 are shown in alternate positions, the positions of deenergization of their respective solenoids. It would have unnecessarily encumbered the drawing to complete connections between all solenoid coils of the blocking switches and deck 35 of stepping switch 16.

The alternate, or deenergized, position of blocking switch 47—48—49 causes the control winding 43 to be shorted through switch 49. With reference winding 44 energized, the shorting of control winding 43 will positively immobilize motor 40 so that it will be unable to rotate. This positive blocking, immobilizing, or freezing of motor 40, during the period its control winding is not connected to conductors 45 and 46, from the output of the motor drive circuit of 22, within unit 17, is a distinctive feature of the invention. Thus, as stepping switch 16 moves the contact arm of deck 35 over its plurality of positions, the individual blocking switches of the motor group are sequentially energized to unlock their motors and connect them to the output of unitary circuit 17. As the telemetering circuit scans the plurality of conditions to which the thermocouples are exposed, the motors of group 15 will be positioned to indicate the magnitude of the conditions to which the individual thermocouples are exposed for periods basically determined by the speed with which the stepping switches are actuated by rotation of cam 26 and the closing and opening of switch 25.

Unitary circuit 17

Fig. 2 has been provided to depict, in detail, the circuit arrangements within the components 20, 21, 22 of converter-amplifier-motor drive circuit 17. The circuits of converter 20, reference 21 and amplifier-motor control 22 are substantially duplicates of the disclosure of similar circuits in Harold H. Koppel SN 539,060 filed October 7, 1955 now Patent 2,835,855. A supply of A.-C. voltage line supply for the units is clearly indicated and oriented with the more diagrammatic disclosure of Fig. 1. The input to the circuit is depicted as entering converter 20 of unit 17 over transmission lines 5 and 6. The output of the circuit is considered as over common conductors 45 and 46, and these are also positionably oriented with the disclosure of Fig. 1.

The output, on transmission lines 45 and 46, is shorted through resistance 33 by switch 32. The shorting by time-delay relay 31 closing switch 32 has been discussed previously as coordinated with the stepping of switch 16. The reason for this period of shorting will become evident from an analysis of this disclosure of Fig. 2.

In further orientation with Fig. 1, conductors 36A and 37A have been indicated, these conductors going to the contact arms-decks 36 and 37. Completing the orientation, conductor 50 connects the negative side of the reference 21 permanently to one side of the slidewires of the potentiometers of motor group 15.

Input transmission lines 5 and 6 are connected into the bridge circuit of converter 20. Transmission line 5, of the pair, is the grounded side. Filter circuits are connected between this line and the other one of the transmission pair as well as between conductor 36A, from the brush of the potentiometers of the motor groups 15 adjusted by the motors. These filters are conventional, two-stage combinations of resistances and capacitances and are identified in Fig. 2 as 51 and 52. These filters are quite important in isolating undesirable pick-up voltages to which transmission lines 5 and 6 may be exposed and to which conductor 36A may be exposed in connection with motor group 15.

Filters 51 and 52 obviate the necessity of expensive electromagnetic and electrostatic shielding of the conductors extending between unitary circuit 17, the transmitter and motor group 15. However, the characteristics of these filters raise another problem which was solved by the use of a device which temporarily shorts the output of the motor drive circuit of 22 placed on conductors 45 and 46, for a predetermined length of time. The concept of a shorting structure is embodied in time-delay relay 31.

Figure 3:
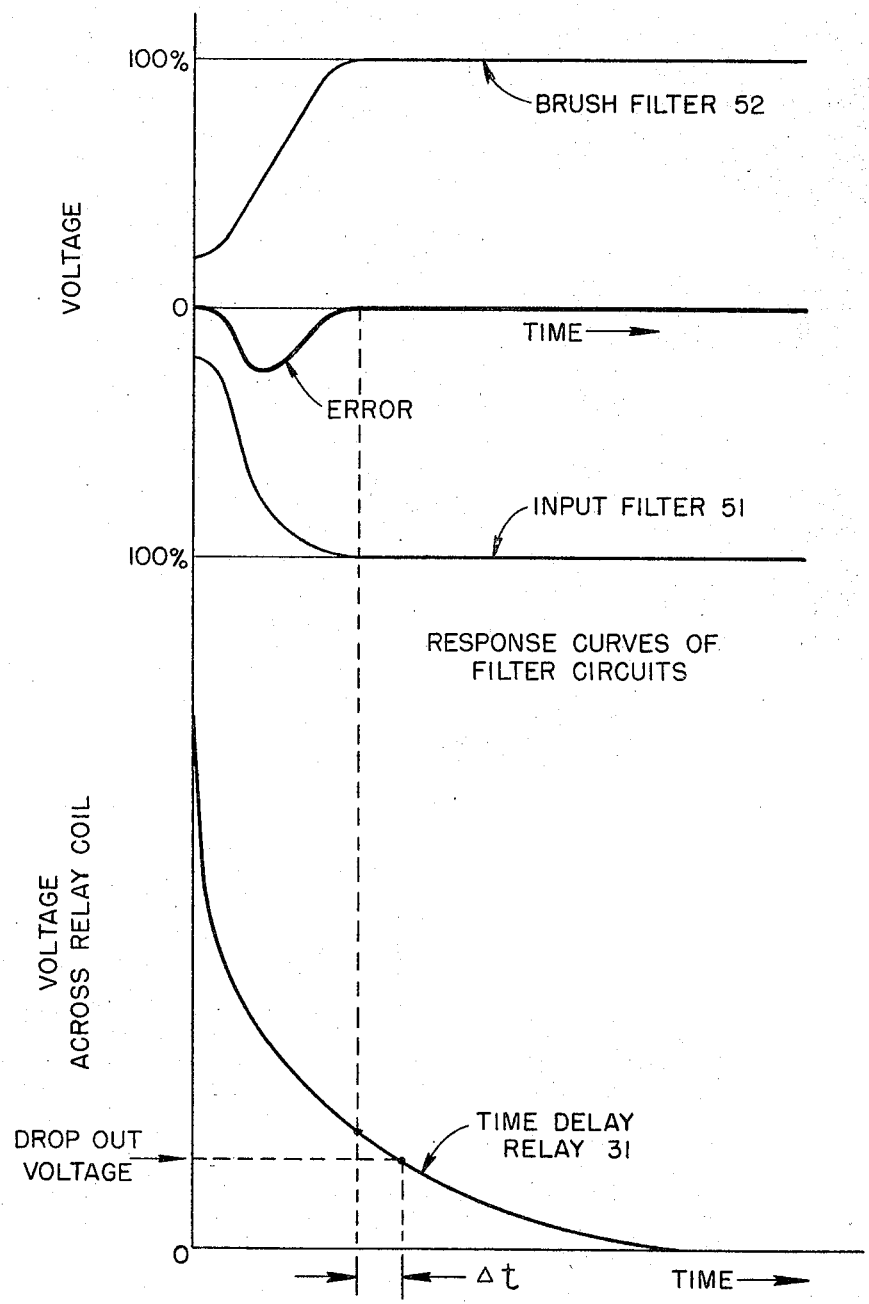
Fig. 3 is a graph of voltage variations produced in the operation of the structure of the preceding figures.

Referring to Fig. 3, the actual function of filter 51 and filter 52, in the balanceable electric networks, can be fully analyzed. Considering the network formed as disclosed in Fig. 1, input filter 51 and brush filter 52 will have a charge across their capacitors equal to the input voltage established by the condition to which thermocouple 1 is exposed when the network is in balance. When the stepping switches shift to their next position, a new charge is established, if the output of thermocouple 2 is different from that of thermocouple 1. In assuming their new values established by thermocouple 2, the voltages across the filters will vary individually. Due to many factors which are not subject to economical control, such as aging and variation of manufacturing tolerances, the time constants of two filters vary from each other. As the new input voltage of thermocouple 2 is applied to the input filter 51, and a new balance-back voltage is applied to the brush filter 52, it will take a finite period of time for these capacitors to reach their new, equal voltages.

The graph of Fig. 3 has been provided to illustrate the differential characteristics of the voltage variations across the filters in reaching equality, with consequent production of an undesirable transient voltage which is sent out by converter 20, amplified in 22 and applied to conductors 45 and 46, going to the motors of group 15.

It will take little imagination to appreciate that the error voltage plotted, on a time basis, in the graph of Fig. 3, represents the difference in voltages imposed on the two filters when the unitary circuit 17 is shifted from one thermocouple to the next. The general shape of the curves is dictated by the two-stage character of the filters. The upper curve has an individual time constant which allows the new voltage to be assumed over a period of time as plotted. The balance-back voltage applied to the brush filter 52 assumes an equal value but in conformance with its individual time constant. Consequently the two plots are dissimilar.

The resulting difference between the curves of the filters has been illustrated as a transient curve pip which rises to a material value for a finite period of time, before the two voltages equalize. It is this transient voltage, which, if applied to the motors of group 15, will move them and disturb the record and/or control exerted by the motors in their positioning. To isolate this undesirable condition, time-delay relay 31 was evolved and applied to control of the output of unitary circuit 17 with switch 32 and resistance 33.

Directly below the response curves of the filter circuits has been plotted the decay of voltage in the solenoid coil of time-delay relay 31. The shape of this curve is adjusted by sizing the resistance of the coil and capacitor in the circuit of relay 31. Again, the function of this relay is to short the output of the motor drive circuit of amplifier-motor control circuit of unit 17 through resistance 33 while the undesirable, transient, difference in voltage between the filters 51 and 52 exists. It is important that the resistance in series with the coil, and the capacitance shunting the coil, be established at a value insuring energization of the coil to its pick-up state before de-energization of the circuit of the time-delay relay.

It can now be appreciated that the action of the stepping switches is actually in two stages. Energization of their solenoid coils prepares the contact arms for actually shifting to their next points. This is done by what may be termed a "unlatching" motion of the parts of the stepping switches. A spring member then carries the switch arms to their next contact point when the solenoid coils are deenergized. Therefore, when solenoid coil 27 is energized from transducer 24, and contact 28 energizes stepping switch solenoid 29, the switch arms 35—36—37 do not actually move to their next points. However, contact 30 closes and time-delay relay 31 is energized to short across conductors 45 and 46 in order that the output of unitary circuit 17 will be dissipated in resistance 33. Then, as cam 26 opens, switch 25 and stepping switch solenoid 29 is subsequently deenergized, switch arms 35—36—37 are shifted to their second points, and the input to the circuits, from thermocouple 2, is applied to the filter circuit 51 and filter circuit 52 has the balance-back voltage generated across it.

The new voltages now generated in the filter circuits 51 and 52, as represented by the response curves of Fig. 3 produce the undesirable resultant voltage in the output of the motor drive circuit of circuit 22, but it is dissipated in resistance 33 and, therefore, isolated from the motors. Switch 30 energizing time-delay relay 31, is opened at the beginning of the period in which the filter circuits have their new voltages generated in them and the voltage across solenoid coil of time-delay relay 31 decays in accordance with the plot in Fig. 3. The beginning of this period is designated as zero on the time axis. The drop-out voltage of relay 31 is reached after the undesirable voltage output of the filter circuits have been dissipated in resistance 33. Switch 32 is then opened and the unbalance voltage output of unitary circuit 17, if an unbalance exists, is applied to common conductors 45 and 46 to position the motor B of motor group 15.

Thus it can be appreciated that the invention has solved another specific problem associated with scanning techniques in telemetering circuits. The transient appearance of unbalanced voltages due to internal adjustment of loads within circuits common to the scanned components is isolated from affecting the ultimate manifestation of the exhibiting and/or controlling motors.

What we claim as new, and desire to secure by Letters Patent of the United States, is:

1. A telemetering scanning system including, a pair of electric conductors, a first stepping switch connected to the transmitting end of the conductors, a plurality of primary element transducers individually responsive to variable conditions to produce electrical effects representative of the conditions and arranged to be sequentially connected to the electric conductors through the first stepping switch, a plurality of balanceable electric network components at the receiving end of the conductors each individually including a primary element transducer and each adapted to individually manifest the value of the condition thereof, a unitary circuit assembly at the receiving end of the conductors responsive successively to unbalance appearing in each balanceable electric network in which a primary element transducer is included in order to cause rebalancing of the network and manifestation of the condition value, a second stepping switch sequentially connecting the unitary circuit assembly to respond to the balanceable electric networks, and synchronizing structure for the stepping switches for sequentially including each primary element transducer in a predetermined one of the balanceable electric networks with the unitary circuit assembly responsive to network unbalance.

2. The system of claim 1 in which the synchronizing structure includes, a tone signal generator at the receiving end of the conductors, transducers of tone to D.-C. at the transmitting and receiving ends of the conductors, circuits connecting the transducers of tone to D. C. and the stepping switches, and a circuit between the generator and transducers of tone to D. C. provided for interruption at a predetermined rate.

3. The system of claim 2 in which a time-delay relay is connected to provide a brief shorting for the output of the unitary circuit assembly which causes the balanceable electric networks to rebalance and manifest the condition values, and means to actuate the time-delay relay by the transducer of tone to D. C. at the receiving end of the conductors.

4. The system of claim 3 in which, rotary electric motors are provided to position adjustable circuit elements in the balanceable electric networks to rebalance the networks, the drive circuits between the motors and the unitary circuit assembly are completed through individual switches, the drive circuit switches are actuated by solenoid coils whose circuits with a source of supply are completed through the second stepping switch, and blocking circuits for the motors are completed through the drive circuit switches when their circuit with the source of supply is broken by the second stepping switch.

5. In a telemetering scanning system; a transmitting station including, a plurality of transmitters wherein each transmitter produces an electrical effect representative of a variable, a common electric connection between transmitters, a separate connection for each transmitter, a stepping switch selecting the separate connections in a predetermined sequence, a pair of transmitting electric lines with the common electric connection of the transmitters connected to one of the pair, and a mechanism for actuating the stepping switch in sequentially connecting the separate connections to the other of the pair; and a receiving station including, a plurality of motors each of whose position manifests the magnitude of an electrical value applied to its control windings, an electric circuit element for and positioned by each motor to balance the electrical effects of a transmitter, a double-throw and switch operator for each motor alternately immobilizing the motor and connecting the motor in circuit with its transmitter, a converter-amplifier-motor drive electric network connected to the transmission line pair and sequentially to the electric circuit elements in order to sequentially receive the electrical effects of the transmitters and compare them with the electrical effects of the elements, a stepping switch for sequentially connecting the converter-amplifier-motor drive electric network to the plurality of motors and electric circuit elements and double-throw switch operator, and a mechanism for actuating the stepping switch in synchronization with the transmitting stepping switch.

6. The system of claim 5 in which, a time-delay relay is provided to short the output of the motor drive circuit for a predetermined length of time prior to its connection to any motor by the stepping switch.

7. The system of claim 6 in which, the converter-amplifier-motor drive electric network includes, a first filter network in the input from the transmission line pair, and a second filter network in the input from the electric circuit elements, whereby the converter-amplifier-motor drive circuit is given an undesirable transient output during only the predetermined shorting time.

8. In a telemetering system, a plurality of electric transducers with outputs which vary in accordance with a plurality of conditions, a transmitting selector switch connected to the transducers, a circuit for receiving the variable outputs of the transducers to amplify the outputs and to apply the outputs to motor drive circuits, a receiving selector switch controlling application of the output of the receiving circuit to the motor drive circuits, a plurality of motors whose drive circuits are arranged to be sequentially connected to the receiving circuit by the receiving selector switch, means for stepping the transmitting and receiving switches through their sequence together, blocking means energized through the receiving switch for positively immobilizing each motor while the motor is not connected to the receiving circuit, means positioned by the motors to balance the outputs of the transducers amplified by the receiving circuit, and means positioned by the motors to manifest their positions as representative of the magnitude of the output of the transducer to which each is periodically connected.

9. The system of claim 8 wherein; the motors are capacitor-run motors having, one winding permanently connected to a line supply, and a second winding to which the driving output of the receiving circuit is applied through the receiving selector switch; and the blocking includes a switch through which the connection between the receiving switch and the second motor winding is completed and alternately the second motor winding is shorted.

10. The system of claim 9 wherein, the blocking switch is controlled between its two positions by a solenoid energized through the receiving switch.

11. The system of claim 10 in which the receiving switch includes, a first set of contacts for connecting the solenoid of the blocking switch to a line supply, and a second set of contacts for connecting the receiving circuit to the balancing means positioned by the motors.

References Cited in the file of this patent
UNITED STATES PATENTS

| | | |
|---|---|---|
| 1,849,827 | Fitzgerald | Mar. 15, 1932 |
| 1,889,730 | Lake | Nov. 29, 1932 |
| 2,706,799 | Howe | Apr. 19, 1955 |
| 2,738,493 | Mesh | Mar. 13, 1956 |